J. W. Cochran,
Rail Bolt.
No. 110,826. Patented Jan. 10, 1871.
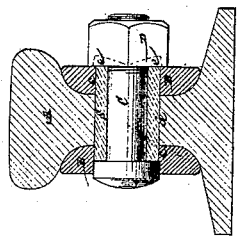
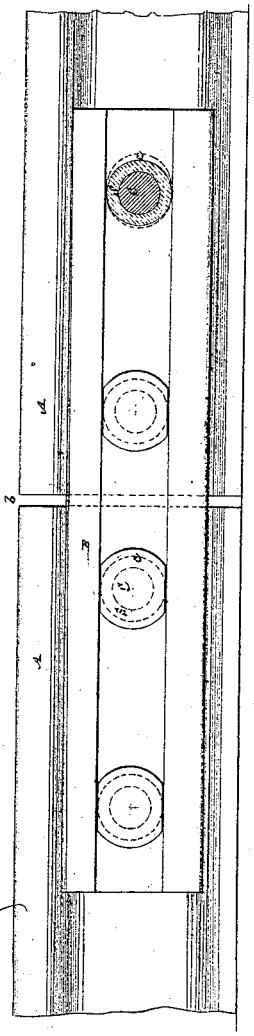
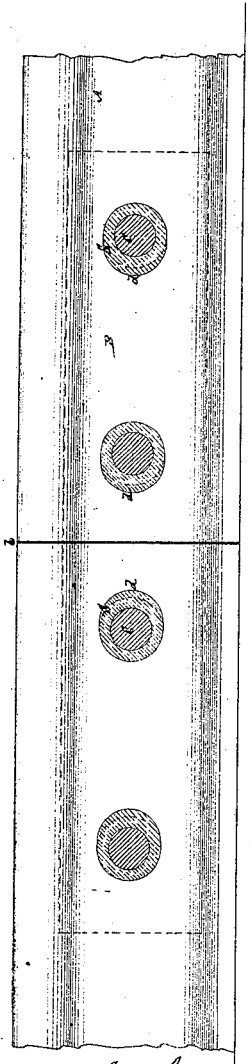

United States Patent Office.

JOHN W. COCHRAN, OF NEW YORK, N. Y.

Letters Patent No. 110,826, dated January 10, 1871.

---

IMPROVEMENT IN INSULATED BOLTS FOR RAILWAY-RAILS.

---

The Schedule referred to in these Letters Patent and making part of the same.

---

*To all whom it may concern:*

Be it known that I, JOHN W. COCHRAN, of the city, county, and State of New York, have invented a new and useful Insulated Bolt, applicable to Connecting or Securing Railroad-Bars and other purposes, of which the following is a full, clear, and exact description, reference being had to the accompanying drawing forming part of this specification, and in which—

Figure 1 represents a side view of two lengths or sections, in part, of a line of rail, with fish-bars and my insulated bolt applied to the same.

Figure 2, a transverse section thereof, in line of one of the bolts by which the fish-bars and rails are united.

Figure 3, a side view, with one of the fish-bars removed, and showing the rails as drawn together by expansion, instead of being separated at their joint by contraction, as represented in fig. 1.

Figure 4 is an interior face view of a nut which may be used in connection with the insulated bolt.

Similar letters of reference indicate corresponding parts.

My invention consists in what I term an insulated bolt, mainly designed for insertion through the rails and fish-bars of a line of rail to hold them together, but applicable to a variety of purposes whenever it is desirable to insulate or protect, as against vibration, the shank of the bolt from contact with the body or bodies through which it passes.

It will suffice here, however, to restrict description of the invention to its use as hereinbefore named, and in which the bolts are insulated from contact with the rails and fish-bars by sleeves of India rubber or other soft and elastic material, whereby injury to the bolts or metal of the bars and rails consequent on vibrations at the joints of the rails, or at the bolted connection with the fish-bars, is prevented, and the rails are protected from slip or displacement by draft on them in direction of their length, as liable to be produced by trains when in motion over them.

The invention also consists in a combination, with said insulating-sleeve, of a notched or serrated nut, applied to the bolt which passes through the sleeve, to protect the bolt or its nut from working loose, by compression of the end of the sleeve into the notches of the nut.

Referring to the accompanying drawing—

A A represent two rail lengths or sections, in part, connected at their ends or joint *b* by fish-bars B B, which are secured to the rails by bolts C C and nuts D D.

The holes through the rails and fish or connecting-bars are of larger dimensions than the bolts C C, which pass through them, but need not necessarily be larger than the holes heretofore used in rails and bars of the same size, as my improvement admits of smaller bolts being used without detracting from the strength of the connection.

The holes *c* through the fish-bars may be cylindrical, but the holes *d* through the rails should be made oblong, to provide for expansion and contraction of the rails.

Arranged around each bolt C is an insulating-sleeve made of India rubber or other soft and elastic material.

This sleeve is of such diameter as to fit and fill the holes *c* of the bars, through which, and the hole *d* of the rail, it passes; and, when first fitted to its place, projects beyond the outside face or faces of either bar, so that, when screwing the nut D onto the bolt, said sleeve S is compressed and made to pack or fill the several holes, and to securely insulate the bolt or shank thereof from contact with the bars and rails.

By means of these insulated bolts both the rails, bars, and bolts themselves are protected from that injury to the fiber or crystals of the metal of which they are composed that naturally attaches to vibration, and which is the result of the heavy shocks the rails are exposed to when in use, and that produce a violent hammering on the bolts, which, when not insulated as described, sooner or later become defective and break, or the bars and rails break from a like cause.

The elastic insulating-sleeves S form cushions which prevent this, and they further serve, when compressed by the nuts, to establish an elastic tie or hold of the rail sections to each other, which, while admitting of the expansion and contraction of the rails, protect them from longitudinal slip or strain upon the sleepers consequent upon the draft produced by the trains or engines when starting and in motion over them.

The nuts D are notched or indented on their inner faces, as represented in figs. 1 and 4, so that, on screwing them home and against the protruding ends of the elastic sleeves S, said sleeves are made to bite in or enter the notches *e* of the nuts, which serve to hold the nuts from becoming loose on or detached from their bolts.

In this way the sleeves S are made to perform several functions.

Insulated bolts, or bolts with the elastic sleeves fitted to them, and having nuts on their ends, may be made to constitute a new article of manufacture, complete in itself.

What is here claimed, and desired to be secured by Letters Patent, is—

1. The combination, with the bolt C, of the insulating-sleeve S, made of soft and elastic material, and applied to the shank of the bolt, when said sleeve is made to extend the entire length of the bolt, between its head and nut or ends, substantially as and for the purpose specified.

2. The combination, with the insulating-sleeve S, on the bolt C, of the nut D, formed with notches or indentations, *e*, in it, essentially as herein set forth.

J. W. COCHRAN.

Witnesses:
FRED. HAYNES,
R. E. RABEAU.